United States Patent [19]

Twerdochlib

[11] Patent Number: 4,790,189

[45] Date of Patent: Dec. 13, 1988

[54] METHOD FOR ELIMINATING SENSOR DRIFT IN A VIBRATION MONITORING SYSTEM

[75] Inventor: Michael Twerdochlib, Oviedo, Fla.

[73] Assignee: Westinghouse Electric Corp., Pittsburgh, Pa.

[21] Appl. No.: 20,827

[22] Filed: Mar. 2, 1987

[51] Int. Cl.[4] .......... G01H 11/00

[52] U.S. Cl. .......... 73/660

[58] Field of Search .......... 73/660, 661; 324/207, 324/208; 364/508

[56] References Cited

U.S. PATENT DOCUMENTS

| | | | |
|---|---|---|---|
| 3,929,008 | 12/1975 | Zlotin et al. | 73/660 |
| 4,422,333 | 12/1983 | Leon | 73/660 |
| 4,518,917 | 5/1985 | Oates et al. | 73/660 |
| 4,573,358 | 3/1986 | Luongo | 73/660 |
| 4,593,566 | 6/1986 | Ellis | 73/660 |

FOREIGN PATENT DOCUMENTS

| | | | |
|---|---|---|---|
| 0857728 | 8/1981 | U.S.S.R. | 73/660 |

*Primary Examiner*—Stewart J. Levy

*Assistant Examiner*—Lawrence G. Fess

*Attorney, Agent, or Firm*—D. C. Abeles

[57] ABSTRACT

A method is disclosed for eliminating aberrations in position-time data provided by an apparatus which monitors the position of a rotating blade in a turbo machine as a function periodic rotation, the apparatus including at least one sensor adjacent at least one blade position to provide a time signal corresponding to the actual arrival time required for a blade to move from a predetermined position to the at least one sensor position, the aberrations being caused by misalignment or movement of the at least one sensor with respect to a rotating blade. The method comprises the steps of first calculating an average blade arrival time for blade movement from the predetermined position to the at least one sensor position, and then estimating sensor position relative to the predetermined position based on blade velocity and average arrival time. Alternatively, measured displacements between blade position and sensor position at the average blade arrival time may be used to derive a time signal indicative of blade vibration.

6 Claims, 3 Drawing Sheets

S4 t1,1 3 2 S3 4 1 S1 5 6 S2

S4 t2,1 4 3 S3 5 2 S1 6 1 S2

S4 t1,2 4 5 3 S3 S1 6 2 1 S2

ONE ROTATION

METHOD FOR ELIMINATING SENSOR DRIFT IN A VIBRATION MONITORING SYSTEM

FIELD OF THE INVENTION

This application relates in general to turbo-machinery and in particular to an improved method of monitoring and diagnosing blade vibration in one or more rows of rotating blades of a turbo-machine.

BACKGROUND OF THE INVENTION

A high speed turbo machine, such as, for example, a steam or gas turbine, generally comprises a plurality of blades arranged in axially oriented rows, the rows of blades being rotated in response to the force of a high pressure fluid flowing axially through the machine. Due to their complex design, natural resonant mechanical frequencies of the blades may coincide with or be excited by certain blade rotational speeds and rotational harmonics thereof. Efforts are made to design turbine blades so that they do not resonate at the normal operating speed and critical harmonics of the speed of the machine. Otherwise, blade resonances excited by rotational speed may create stresses which break the blade and cause extensive damage, thus shutting the machine down and requiring extensive repair. In order to avoid the aforementioned problem, detailed testing is performed prior to operation of a machine to ensure that blades will not resonate during normal operation.

It is also desirable to monitor rotating blades during operation in order to identify vibration problems which develop after a turbo machine is put in use. This on-line evaluation is necessary in part because evaluations performed prior to actual use do not subject the blades to the same temperature, pressure and rotational conditions which are experienced during normal operations. Continuous monitoring of blade vibrations is also important in order to detect new vibrations which signal structural changes. If any of these vibrations escape detection, developing fractures will likely lead to extensive damage and costly down time while the machine undergoes repair.

Although previous methods of performing off-line evaluations have successfully eliminated many serious vibration problems, system designs for on-line detection have not provided for the reliable and comprehensive monitoring which is desired in order to avoid the above described problems. Systems having a limited capability for monitoring on-line blade vibrations have utilized a plurality of permanently installed non-contacting sensors. These sensors are radially disposed about the rotating blades in order to monitor vibration of individual blade tips about their normal positions in a rotating time frame. An exemplary design is disclosed in U.S. Pat. No. 4,573,358 to Luongo. This and other systems designed to provide vibration signals to analysis equipment have several limitations affecting their suitability for monitoring turbo machinery at steady or synchronous speeds without interruption of operation. None of these systems are believed suitable for continuously monitoring at steady or synchronous speeds the multitude of blades found in turbo machinery in order to quickly detect new structural defects and take a machine off-line before extensive damage occurs. For example, the generally recognized phenomenon of misalignment, a static effect found in permanently mounted sensor systems, results in distortion of the vibration wave forms which are reconstructed from blade displacement data. Prior efforts to introduce compensation factors for these shifts have been essentially one time corrections which are not suitable for monitoring machinery during steady or synchronous speed operation. The technique disclosed by Luongo introduces corrections for sensor drift based on low speed rotational data taken between known resonant frequencies of the blades in order to monitor blade position at frequencies for which vibrations are believed to be absent. While collection of correction data at frequencies below normal operating speeds does provide for an accurate determination of sensor position in the absence of any blade resonances, it is often not possible or convenient to vary the speed of an operating machine in order to acquire this data. This constraint is present in power plants which must keep turbines running at synchronous speed in order to maintain constant electrical power frequency. Furthermore, correction data acquired at lower than operating speeds cannot take into consideration the differing dynamic effects between measurement speeds and operating speeds. For example, thermal expansion and centripetal forces further alter sensor alignments once the machine resumes operational speed. Nor does application of this approach to on-line machines lend itself to continuous correction of significant errors which are due to sensor displacement. Absent an improved static and dynamic correction technique for sensor misalignment, data acquired through continuous monitoring tends to become distorted as sensor positions drift. Therefore, it is believed that a continuous correction technique is necessary to further minimize sensor drift effects which lead to undesirable noise in the signal analysis. Such an improved correction technique should allow for effective monitoring of blade tip vibration without any interruption of equipment operations.

SUMMARY OF THE INVENTION

Among the several objects of the present invention may be noted the provision of an improved method for monitoring the vibration of a plurality of blades in a blade row of a turbo machine which overcomes the above discussed disadvantageous or undesirable features, as well as others, of the prior art; the provisions of such an improved monitoring method including a technique for isolating the effects of sensor misalignment and drift from blade vibration; the provision of such an improved method which is suitable for monitoring on-line turbo machinery without any interruption in machine operations; the provision of such an improved monitoring method which results in reliable and continuous data in order to quickly detect new vibration problems and take a machine off-line before extensive damage occurs; the provisions of such an improved monitoring method including a means for continually correcting data in order to avoid error in signal analysis due to sensor misalignment and drift; the provisions of such an improved monitoring method being adaptable to a computer based vibration monitor which simultaneously senses the positions of a plurality of blades in a rotating row and provides updated sensor correction data as often as each rotational period; and the provision of such an improved monitoring method which determines the average blade arrival time for a plurality of blades at each sensor position in order to continuously compensate for sensor misalignment and drift.

In general, a method is provided for monitoring blade vibration with an apparatus which senses the positions of individual blades of a rotating blade row in a machine, the apparatus including a plurality of sensors disposed about the blade row with each sensor providing a time dependent output signal responsive to the passage of a blade. The apparatus may be a computer-based vibration monitor which stores sensor output signals as a function of time determinable from the rotational period of the blade row.

DETAILED DESCRIPTION

The inventive method is described by way of example with particular application to vibration monitoring of a steam turbine, but it is to be understood that the method is suitable with monitoring systems which are adapted for bladed turbo-machines generally.

Figure 1:
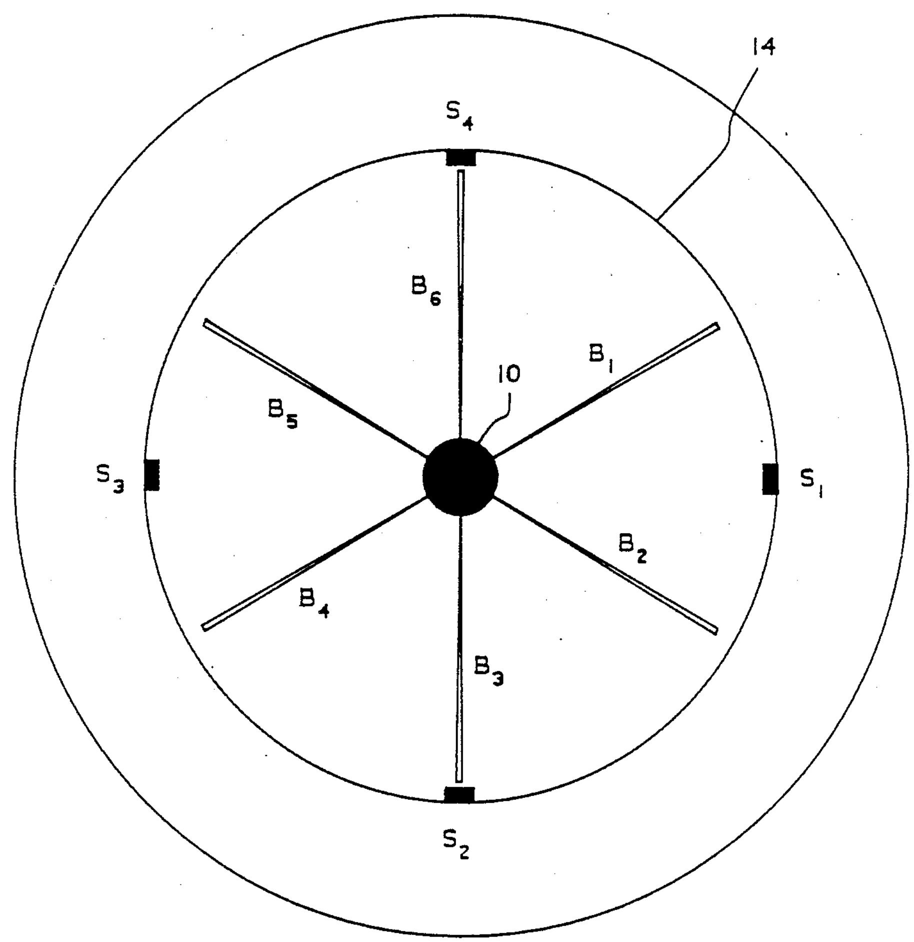
FIG. 1 is a axial view of a simplified turbine including a row of 6 blades having 4 sensors disposed thereabout.

Referring first to FIG. 1 there is illustrated a typical arrangement of sensors, $S_j$, where j represents a number from 1 to N, disposed about a blade row of a steam turbine. For simplicity, FIG. 1 shows only four sensors attached to a rigid retaining surface 14 which may be the turbine inner casing or flow guide. The turbine comprises a plurality of rotating blade rows each including a predetermined number of blades $B_i$ where i represents a number from 1 to m, which are connected to a rotating shaft 10. FIG. 1 only illustrates a single blade row disposed about shaft 10. To simplify the disclosure of the inventive method a configuration is presented wherein the row has only six blades $B_1$, $B_2$, $B_3$, $B_4$, $B_5$ and $B_6$ and the monitor includes four sensors $S_j$ ($S_1$, $S_2$, $S_3$ and $S_4$) disposed thereabout. In this simple embodiment the blade row rotates in a clockwise direction as indicated by the arrow shown in FIGS. 2–4. It is to be understood that the method disclosed herein is suitable for any number of turbine blades and sensors.

A computer based vibration monitor suitable for application with the inventive method may simultaneously monitor vibration in each of the blades $B_i$ during an arbitrary number of sequential rotational periods. In a preferred embodiment the vibration monitor would comprise a plurality of magnetic sensors equally spaced about the blade row. However, the method may be adapted to work with a single sensor or sensors uequally spaced about the disk. Shaft position may be determined by reference sensors (not shown) which provide the monitoring system with signals corresponding to shaft rotation as is disclosed in U.S. Pat. No. 4,573,358 and common to many turbine systems. The monitoring system must time the rotational movement of each blade from a predetermined reference point to each sensor. For example, by defining sensor $S_4$ as a reference position and notating the arrival time of each blade $B_i$ at each sensor $S_j$ by $t_{i,j}$, a sequence of arrival times may be developed based on the time a blade $B_i$ passes sensor $S_4$. With the $S_4$ output signal defining a reference time, the time sequence by which blade 1 arrives at each sensor is given by $t_{1,1}$, $t_{1,2}$, $t_{1,3}$, $t_{1,4}$. For multi-rotational periods the sensor subscript number may be increased sequentially. For example, the sequence of time intervals for blade 2 based on measurement through three rotations is given by the following sequence:

$$t_{2,1}, t_{2,2}, t_{2,3}, t_{2,4}, t_{2,5}, t_{2,6}, \ldots t_{2,12}. \tag{1}$$

Figure 2:
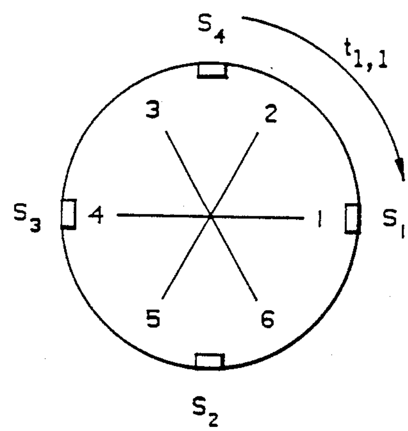
FIG. 2 illustrates the time interval corresponding to the measured arrival time of blade $B_1$ at sensor $S_1$.
Figure 3:
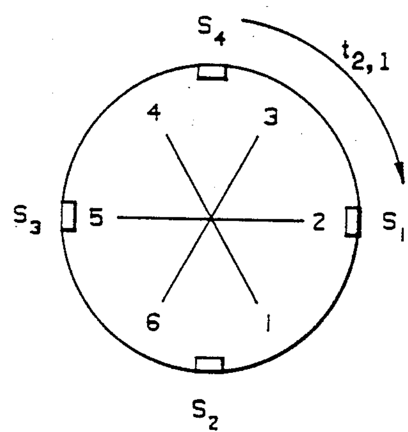
FIG. 3 illustrates the time interval corresponding to the measured arrival time of blade $B_2$ at sensor $S_1$.
Figure 4:
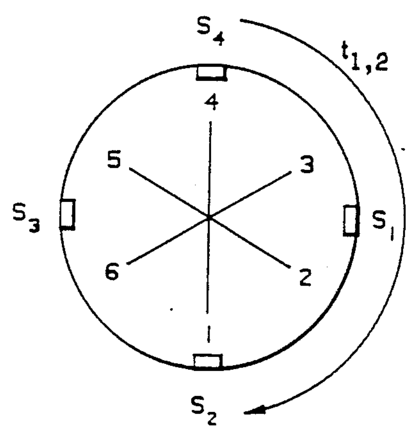
FIG. 4 illustrates the time interval corresponding to the arrival time of blade $B_1$ at sensor $S_2$.

By way of example the time intervals $t_{1,1}$, $t_{2,1}$ and $t_{1,2}$ are illustrated in FIGS. 2, 3 and 4 respectively. Data acquisition through sensor $S_j$ results in a series of time intervals corrresponding to arrival of sequential blades at that sensor position. During a five turn rotation, the time series for sensor $S_j$ would appear as:

$$\begin{aligned} &t_{1,j}, t_{2,j}, t_{3,j}, t_{4,j}, t_{5,j}, t_{6,j}, \\ &t_{1,j+4}, t_{2,j+4}, t_{3,j+4}, t_{4,j+4}, t_{5,j+4}, \\ &t_{6,j+4}, t_{1,j+8}, t_{2,j+8}, t_{3,j+8}, t_{4,j+8}, \\ &t_{5,j+8}, t_{6,j+8}, t_{1,j+12}, t_{2,j+12}, t_{3,j+12}, \\ &t_{4,j+12}, t_{5,j+12}, t_{6,j+12}, t_{1,j+16}, t_{2,j+16}, \\ &t_{3,j+16}, t_{4,j+16}, t_{5,j+16}, t_{6,j+16}. \end{aligned} \tag{2}$$

In the absence of blade vibration $t_{1,1}=t_{2,1}=t_{3,1}=t_{4,1}=t_{5,1}=t_{6,1}$. Generally, $t_{i,j}$ would be equal to $t_{k,j}$ where k is a positive integer less than or equal to the number of blades. However, with blade vibration the blade tips are not necessarily in their normal nonvibrating position with respect to rotating shaft 10 as they pass through each sensor position. In the absence of sensor drift, the vibration monitor would detect blade tip vibration under constant rotational speeds by determining the difference between the actual and the expected arrival time of a blade tip at each sensor position. If the rotational period for a row of blades is denoted by $T_0$, then with equally spaced blades, blade $B_i$ should require a time interval for arrival at sensor $S_1$ of $t_1=T_{0/4}$. The arrival times at the subsequent sensors $S_2$, $S_3$, $S_4$, $S_5$, etc. are given by:

$$\begin{aligned} t_2 &= T_0/2, \\ t_3 &= 3T_0/4, \\ t_4 &= T_0, \\ t_5 &= 5T_0/4, \\ &\vdots \\ t_N &= NT_0/4. \end{aligned}$$

Knowing the velocity, $V_0$, of the tip of a rotating blade $B_i$, the spacial deflection of the blade relative to its normal position with respect to rotating shaft 10 is determinable based on the difference between the actual arrival times $t_{i,j}$ and the expected arrival time $t_j$ of blade $B_i$ at the plurality of sensors $S_j$. Thus, the following sequence of ordered pairs for blade $B_i$ may be used to develop a time series of blade tip vibratory displacement about a normal position with respect to the rotating time frame of shaft 10.

$$[(t_{i,1}-t_1)V_0, t_1], [(t_{i,2}-t_2)V_0, t_2], [(t_{i,3}-t_3)V_0, t_3], \ldots, [(t_{i,20}-t_{20})V_0, t_{20}]. \tag{3}$$

Figure 5:
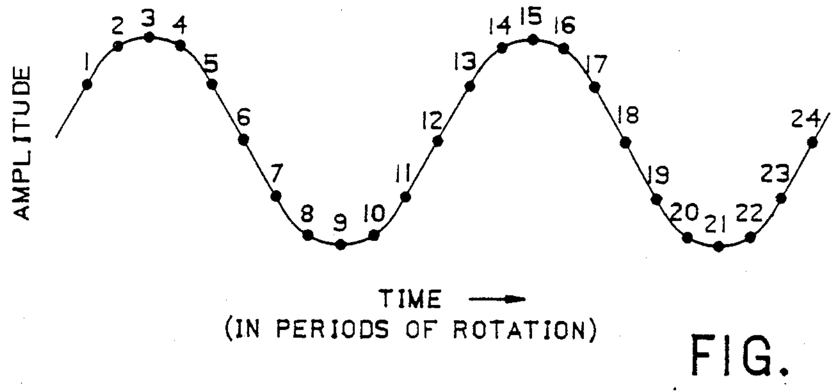
FIG. 5 illustrates an ideal time series of blade tip vibratory displacement data which would be directly measurable if sensor positions did not drift/or are not misaligned.

This displacement signal is graphically illustrated in FIG. 5. Using this data the computer based vibration monitor may perform a Fast Fourier Transform to determine the frequencies and amplitudes of the vibrational modes.

Figure 6:
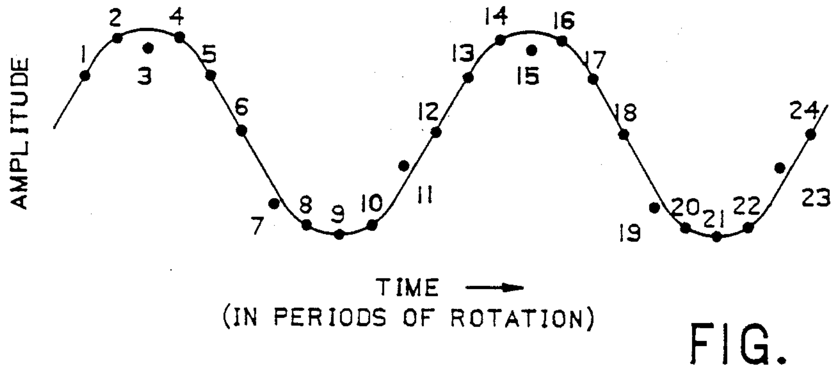
FIG. 6 illustrates the effect of sensor drift on a time series of blade tip vibratory displacement data.

The above described technique for determining modal vibration has been subject to the influence of sensor drift as illustrated in FIG. 6 wherein the amplitude of the vibration signal is offset at the 3rd, 7th, 11th, 15th and 19th points on the displacement curve as a result of drift in the position of sensor $S_3$. If all sensor drifts were displayed, the wave form would be severely distorted and considerable noise would be introduced into the vibration analysis. However, by incorporating the inventive method into this technique, the effects of sensor drift may be avoided by estimating the expected arrival time of each blade at each sensor position based on measured data taken at normal operational speeds. In formulating the displacement signal the inventive method replaces each expected arrival time $t_j$ with $t_{j,avg}$, an average of actual blade arrival times for each sensor $S_j$. Each average is computed for one or more rotations past each sensor. For example, the average blade arrival time at sensor $S_j$ may be estimated based on the passage of all six blades in a single rotation:

$$t_{j,avg} = 1/6 \sum_{i=1}^{6} t_{i,j}.$$

It has been found that irrespective of blade tip vibration, for a given speed the actual arrival time of a nonvibrating blade $B_i$ at a sensor $S_j$ is well approximated by the average arrival time $t_{j,avg}$ of a plurality of vibrating blades. Estimates of the expected arrival time can be further improved by averaging actual arrival times for several rotational periods. Analysis of averages based on multiple rotational periods, indicates that an average based on five periods, i.e., i=1 to 30, provides sufficient accuracy for monitoring blade tip vibration.

Figure 7:
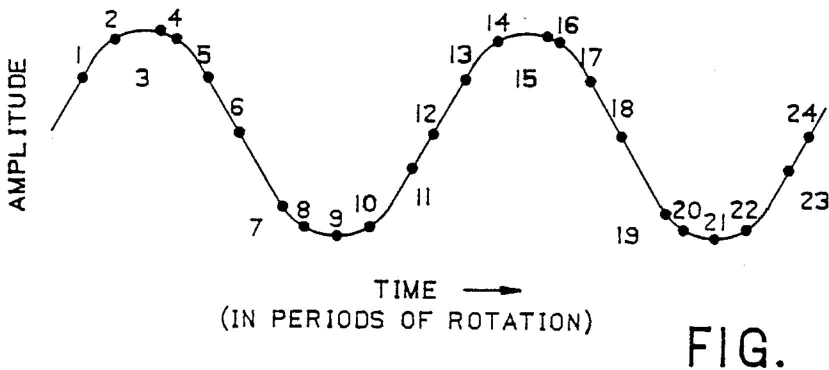
FIG. 7 illustrates corrected displacement data based on computations of average blade arrival times at each of four sensors.

As illustrated in FIG. 7 the effect of employing the time intervals $(t_{i,j}-t_{j,avg})$ in place of $(t_{i,j}-t_j)$ is to shift the 3rd, 7th, 11th, 15th and 19th points in time so that they lie on the true vibration curve.

A general method is provided herein for eliminating aberrations in position-time data provided by sensors which monitor the vibration of individual blades in a rotating blade row. As noted above apparatus suitable for this inventive method may include as few as one sensor mounted adjacent the blade row in order to provide a signal corresponding to the actual arrival time of at least one blade moving from a predetermined reference position to the sensor position. By way of example, implementation of the inventive method with an apparatus designed to monitor vibrations in a single blade $B_1$ with a single sensor $S_1$ would be based on the average arrival time $t_{1,avg}$ for a plurality of rotations. In this simple example the reference position may coincide with sensor $S_1$ so that the average arrival time would approximate the rotational period of the blade. With the inventive method, aberrations in blade vibration data, caused by drifts and misalignment in sensor position relative to blade movement, will be eliminated by deriving the displacement signal on the basis of average blade arrival time $t_{1,avg}$ at sensor $S_1$, a measured quantity rather than expected blade arrival time $t_1$. Thus the displacement signal for blade $B_1$ will comprise the following sequential series of elements:

$$\begin{aligned}
&[(t_{1,1} - t_{1,avg})V_0,\ t_{1,avg}], \\
&[(t_{1,2} - t_{1,avg})V_0,\ 2t_{1,avg}], \\
&[(t_{1,3} - t_{1,avg})V_0,\ 3t_{1,avg}], \\
&[(t_{1,4} - t_{1,avg})V_0,\ 4t_{1,avg}], \\
&\quad\vdots \\
&[(t_{1,N} - t_{1,avg})V_0,\ Nt_{1,avg}]
\end{aligned} \tag{4}$$

where $t_{1,j}$ is the arrival time of blade $B_1$, i.e., the time required for that blade to move from the reference position to sensor $S_1$ during the jth rotation; and $$t_{1,avg} = 1/n \sum_{j=1}^{n} t_{1,j} \text{ for the last } n \text{ periods.}$$

This series forms a signal indicative of vibration in blade $B_1$ based on a time sequence of calculated displacements between actual blade positions and sensor position at each average arrival time.

It is noted that this inventive method for eliminating aberrations in blade vibration measurements is believed to become more effective and reliable when $t_{j,avg}$ is based on the arrival times of a greater number of blades. This is because an individual blade may be vibrating in phase with the shaft rotational frequency or a harmonic thereof. Under these circumstances the average blade arrival time is not expected to differ from the actual blade arrival time $t_{i,j}$. On the other hand, in the illustrative configuration of FIG. 1 wherein a row comprises six blades, the isolated effect of a single blade vibrating in phase with a shaft harmonic will be less significant since $t_{j,avg}$ is based on a greater number of blades. Thus the inventive method provides greater accuracy as $t_{j,avg}$ is based on the arrival times of a greater plurality of rotating blades. Generally the measured displacements due to blade tip vibration will average out in the computation of $t_{j,avg}$; and, so long as relatively few blades vibrate in phase with shaft harmonics, $t_{j,avg}$ will be an acceptable approximation for the expected arrival time of a nonvibrating blade at sensor $S_j$.

It has been determined that the inventive method is also useful when shaft rotational frequency is not constant, but when the frequency is smoothly varying. Under these circumstances $V_0$ may be approximated by the average blade velocity per rotation or for a plurality of rotations. The effect of this approximation may be apparent from modulations in the amplitudes of vibration displacement curves. Nevertheless, a Fast Fourier Transform of the displacement data will provide correct frequency information.

From the foregoing, it is now apparent that a novel method for eliminating the effects of sensor misalignment and drift in a system which monitors vibration of rotating blades has been presented meeting the objects set out herinbefore as well as others, and it is contemplated that changes in the precise steps and order thereof may be made by those having ordinary skill in the art without departing from the spirit of the invention or from the scope of the invention as set forth in the claims which follow.

I claim:

1. A method for monitoring blade vibration with a vibration monitor which senses the position of individual blades of a rotating blade row in a machine, the vibration monitor including a plurality of sensors positioned about a blade row with each sensor providing a time-dependent output signal responsive to the passage of a blade, wherein the vibration monitor stores sensor output signals as a function of time relative to the periodic rotation of the blade row, comprising the steps of:

(a) determining, based on output signals provided from each sensor, the actual arrival time of each of a plurality of blades rotating from a predetermined position to the position of each sensor during at least one blade row rotational period;

(b) calculating an average arrival time required for a blade to rotate from the predetermined position to the position of each sensor;

(c) calculating for at least one blade, based on the difference between the actual arrival time of the at least one blade and the calculated average arrival time required for a blade to rotate from the predetermined position to the position of each sensor, the displacement between blade position and sensor position at the average arrival time for each sensor position; and (d) deriving a signal indicative of vibration of the at least one blade based on a time sequence of calculated displacements between actual blade position and sensor position at each average arrival time.

2. A method for eliminating aberrations in position-time data provided by an apparatus which monitors the position of a rotating blade in a machine as a function of periodic rotation, the apparatus including at least one sensor positioned on the machine, adjacent a path of rotation of the rotating blade to provide a time signal corresponding to the actual arrival time required for a blade to move from a predetermined position to the position of at least one sensor, said aberrations being caused by misalignment or movement of the at least one sensor along the path of rotation, the method comprising the steps of:

(a) calculating an average blade arrival time for blade movement from the predetermined position to the at least one sensor position; and (b) estimating sensor position relative to the predetermined position based on blade velocity and average arrival time.

3. The method of claim 2 wherein estimated sensor position relative to the pedetermined position is the product of blade velocity and average arrival time at the at least one sensor.

4. A method for eliminating aberrations in position-time data provided by an apparatus which senses the position of a rotatoing blade in a machine as a function of periodic rotation, the apparatus including at least one sensor adjacent at least one blade position to provide a time signal corresponding to the actual arrival time required for a blade to move from a predetermined position to at least one sensor position, said aberrations being caused by misalignment or movement of the at least one sensor with respect to a rotating blade, the method comprising the steps of:

(a) calculating an average blade arrival time for blade movement from the predetermined position to the position of at least one sensor; and (b) estimating sensor position relative to the predetermined position based on blade velocity and the average arrival time; and (c) determining as a function of time, actual blade displacement from the position of at least one sensor at the average blade arrival time based on blade velocity and the differences between actual arrival times and the average arrival time.

5. A method for eliminating aberrations in position-time data provided by an apparatus which monitors the position of a rotating blade in a machine as a function of periodic rotation, the apparatus including at least one sensor adjacent at least one blade position to provide a time signal corresponding to the actual arrival time required for a blade to move from a predetermined position to at least one sensor position, said abberations being caused by misalignment or movement of the at least one sensor with respect to a rotating blade, the method comprising the steps of:

(a) calculating an average blade arrival time for blade movement from the predetermined position to at least one sensor position;

(b) determining expected blade positions based on blade velocity and the average blade arrival time calculated for the at least one sensor; and (c) determining, for at least one period of rotation, actual blade positions at the average blade arrival time for each sensor based on blade velocity and the differences between actual arrival times and the average arrival time.

6. A method for monitoring blade vibration with a vibration monitor which senses the position of a rotating blade in a machine, the apparatus including at least one sensor adjacent a blade position, wherein the at least one sensor provides a time-dependent output signal responsive to the passage of the blade, the vibration monitor storing sensor output signals as a function of time relative to the periodic rotation of the blade, comprising the steps of:

(a) determining, based on output signals provided from the at least one sensor, the actual arrival time of a blade as it rotates from a predetermined position to the at least one sensor position during each of a plurality of blade rotational periods;

(b) calculating, based on actual arrival times, an average arrival time required for a blade to rotate from the predetermined position to the at least one sensor position;

(c) calculating for a blade and the at least one sensor, based on the difference between the actual arrival times of a blade and the calculated average arrival time required for a blade to rotate from the predetermined position to the at least one sensor position, the displacement between the position of the blade and the sensor position at the average arrival time of a blade at the at least one sensor position; and (d) deriving a signal indicative of vibration in the blade based on a time sequence of calculated displacements between actual blade position and at least one sensor position at each average arrival time.

* * * * *